United States Patent [19]

Clancy et al.

[11] 4,100,853

[45] Jul. 18, 1978

[54] METHOD OF FORMING A POROUS SHAPED BODY CAPABLE OF RETAINING LIQUIDS THEREIN

[75] Inventors: John J. Clancy, Westwood; Robert C. Wells, Arlington, both of Mass.

[73] Assignee: Arthur D. Little, Inc., Cambridge, Mass.

[21] Appl. No.: 712,441

[22] Filed: Aug. 9, 1976

[51] Int. Cl.$^2$ .............................................. B29D 27/04

[52] U.S. Cl. ................................. 101/401.1; 101/333; 101/367; 264/41; 264/50; 264/87; 521/52; 521/134

[58] Field of Search .................................... 264/86-87, 264/122, 41, 50; 101/327-329, 333, 367, 401.1; 260/2.5 R, 2.5 M

[56] References Cited

U.S. PATENT DOCUMENTS

| | | | |
|---|---|---|---|
| 2,216,785 | 10/1940 | Roberts | 264/50 |
| 3,019,201 | 1/1962 | Clancy et al. | 101/327 |
| 3,253,542 | 5/1966 | McDonough | 101/327 |
| 3,342,759 | 9/1967 | Short et al. | 264/41 |
| 3,474,161 | 10/1969 | Reighter | 264/87 |
| 3,755,517 | 8/1973 | Clancy et al. | 101/333 |
| 3,825,640 | 7/1974 | Maierson | 264/87 |
| 3,923,936 | 12/1975 | Davis et al. | 264/50 |

*Primary Examiner*—Jeffery R. Thurlow
*Attorney, Agent, or Firm*—Bessie A. Lepper; David E. Brook

[57] ABSTRACT

A method is disclosed for forming a porous shaped body from rubber-like particles. The resulting shaped body is capable of retaining relatively large amounts of a liquid, such as ink, within its pores. Retained liquids can be controllably dispensed from the porous body by bringing it into pressure contact with a receptor surface.

30 Claims, 3 Drawing Figures

METHOD OF FORMING A POROUS SHAPED BODY CAPABLE OF RETAINING LIQUIDS THEREIN

BACKGROUND OF THE INVENTION

1. Field of the Invention

This invention is in the field of articles which retain liquids therein and more particularly relates to porous shaped bodies capable of retaining liquids in a manner which allows the liquids to be controllably dispensed upon the application of pressure to the shaped body.

2. Description of the Prior Art

The desirability of providing porous bodies capable of imbibing, retaining, and subsequently controllably dispensing liquids has been recognized for many years. Such bodies are useful wherever a liquid is to be applied to a receptor surface in limited amounts. Thus, these bodies would be useful, for example, in the application of water to a remoistenable adhesive layer on labels, stamps, envelope flaps, and the like; the application of medicaments or lotions to the body; the application of ink to printing devices; and the application of ink directly to an article or sheet to be marked as with an inked stamp.

There has been a particularly high level of interest in producing such porous bodies which would serve as printing stamps or stamp pads. Bodies suitable for such applications generally consist of a resilient microporous material having a surface corresponding to the character to be printed; they contain a reservoir of ink which is conducted to their surface through the porous structure. Two relatively recent attempts to produce porous applicator structures useful for printing stamps are described in U.S. Pat. Nos. 3,019,201 and 3,755,517, both issued to Clancy et al.

In U.S. Pat. No. 3,019,201, a novel type of applicator structure is described which is capable of retaining a relatively large quantity of liquid which can be delivered from the surface in controlled amounts and in which the supply of liquid can be replenished. Briefly, the method described in this patent comprises binding together loosely packed, generally spherical particles of a resilient material, preferably an elastomer, to produce a porous structure having a continuous interstitial phase, consisting predominantly of the voids that would naturally occur between the packed particles making up the structure. In use, the interstitial regions of the applicator structure contain a supply of the liquid to be fed through the applicator to its applying surface, whether or not the surface is molded to a desired configuration. These interstitial regions are accordingly of capillary dimensions, which render them capable of retaining the liquid. The particles making up the porous structure must be of a material which will be wetted by the liquid to be retained and subsequently delivered at a controlled rate when the porous structure is brought into pressure contact with a receptor surface.

The steps employed to effect the necessary bonding of particles in the process of U.S. Pat. No. 3,019,201 consist of washing or air-cleaning the elastomeric particles to remove any films or particulate material, adding the cleaned rubber-like particles to an alcohol solution of resin binder (which may also contain a semi-solvent or a softening agent for the rubber-like particles), pouring the resultant slurry or paste into a mold, expressing excess liquid from the slurry in the mold, driving off any residual liquid with heat, and curing the structure either within or outside the mold.

The process of U.S. Pat. No. 3,755,517 is similar but provides improved porosity by adding the additional step of incorporating water into the slurry of rubber-like particles to produce a dispersion. This dispersion can then be cast to form a wet structure which is subsequently dried with or without curing. The cast structure can be stored for relatively long periods and subsequently molded just prior to use to produce a final product having a surface with a predetermined configuration. This product is particularly suited as a self-inking printing stamp.

Although the latter process resulted in some improvement, it should be noted that it is primarily directed to producing an intermediate product which can be stored for reasonably long periods of time and subsequently molded with pressure and/or heat into a final configuration. In many applications, however, it is desirable to have a process capable of producing a finished, more intricately shaped product without the necessity of a final molding step. This process should be continuous and efficient, and should produce a final shaped body, as opposed to an intermediate article, which has an excellent balance of porosity and strength. Such a process would lend itself to the efficient, economical production of final, porous, shaped bodies which consistently have the properties desired to retain and subsequently controllably dispense a wide variety of liquids.

SUMMARY OF THE INVENTION

The invention comprises a new and improved method for forming final, porous, shaped bodies from rubber-like particles which bodies are capable of retaining a liquid therein and subsequently controllably dispensing the liquid upon the application of pressure thereto. In this method, a solution is formed of a heat-activatable resin binder in a solvent system containing both a solvent for the resin binder and a softening agent for the rubber-like particles. The rubber-like particles are combined with the resin binder solution to form a particle slurry, after which sufficient liquid-suspending medium is added to the particle slurry to form a particle dispersion in which at least some resin binder is affixed to the rubber-like particles. At this point, it is optional to foam the particle dispersion to achieve even higher degrees of porosity in the final product. This particle dispersion, with or without foaming, is then introduced into a mold having a least one porous wall member so that the mold also serves as a filter. A differential pressure is applied across the mold to remove liquids from the particle dispersion and to form the remaining solids into a shaped body which is self-supporting. This self-supporting shaped body is then heated to an elevated temperature to dry it and to cure the resin binder to produce a shaped body with structural integrity. The resultant shaped body is satisfactory, at this point, for many applications, without the need to undergo further processing steps. Optionally, however, this body can be post-treated such as by applying an appropriate reinforcing solution followed by heating to further cure and/or cross-link the resin. Such optional post-treatment provides additional strength to the shaped body without a significantly concomitant reduction in its porosity.

The liquid to be dispensed, e.g., ink, can be imbibed into the shaped body after the initial heating step following casting, or following post-treatment. This can be conveniently done by immersing the shaped body within the liquid to be imbibed while drawing a vacuum on the shaped body. Liquid imbibed into the shaped body is retained within the interstitial pores, but can be subsequently dispensed by bringing the liquid-retaining body into pressure contact with a receptor surface.

The method of producing porous, liquid-retaining, shaped bodies according to this invention offers significant advantages over previously known methods. Products can be formed, for example, which have a high degree of porosity and yet are strong and durable. This method also provides a continuous and complete process for producing final, intricately shaped porous bodies having the capability to retain relatively large amounts of liquid. Subsequent molding by the ultimate user of a pre-form to a desired configuration, such as was often required with prior art processes, is not necessary. This eliminates problems related to aging, which were previously experienced with prior art methods. It also provides the capability for complete control in the manufacture of the porous material of such important parameters as the exact porosity, shape, strength, rate of delivery, etc.

DESCRIPTION OF PREFERRED EMBODIMENTS

The method of this invention will now be described by referring to the Figures in more detail.

Figure 1:
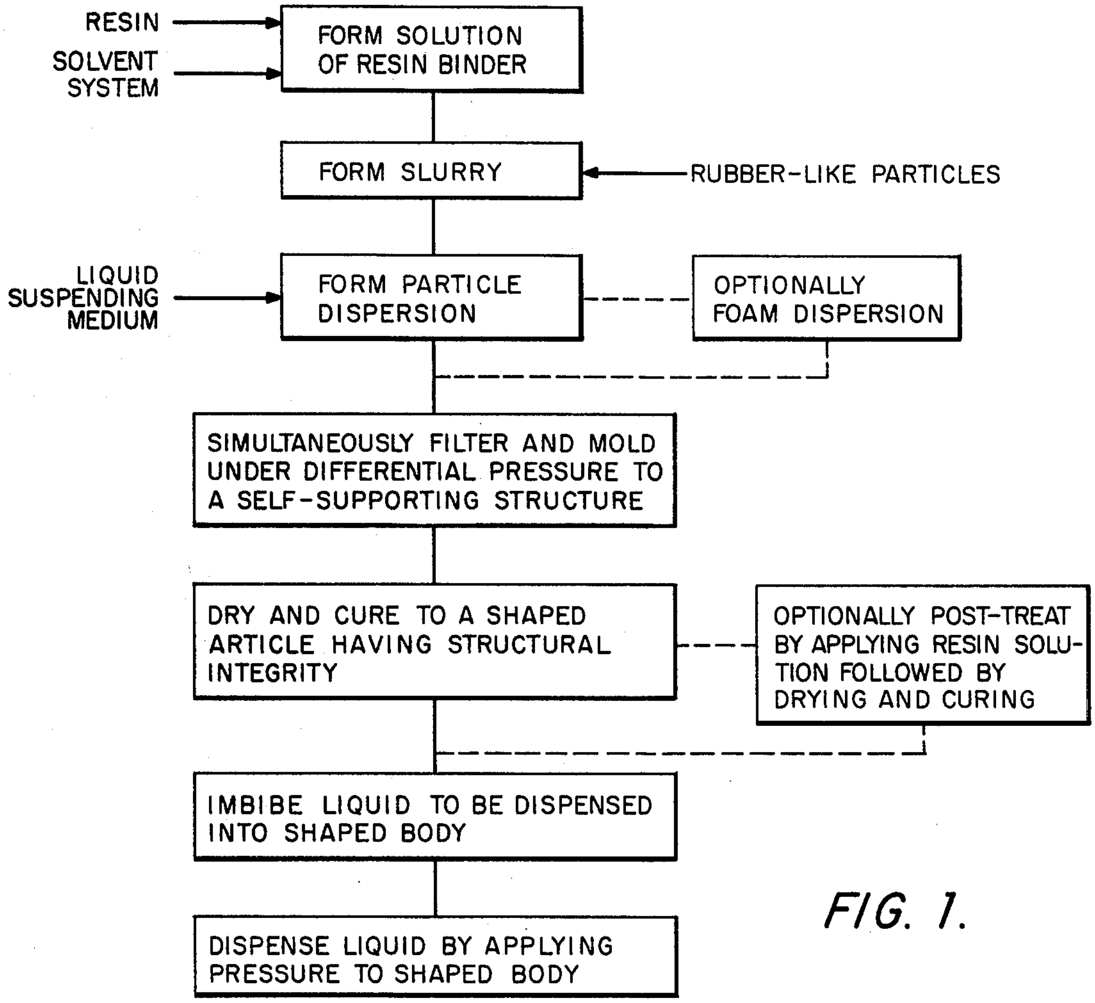
FIG. 1 is a flow diagram illustrating both necessary and optional steps in the method of this invention.

As can be seen from FIG. 1, the initial step is the preparation of a solution of a resin binder in a solvent system. Suitable resin binders include, but are not limited to, such materials as phenolic (e.g., phenol-formaldehyde) epoxy, vinyl and blocked isocyanate resins. Resorcinol-formaldehyde resins are also suitable where there are no long interruptions between the various steps of the method. Binders used must, of course, be compatible with the particles and must also be compatible with and inert to the liquid to be contained within the completed porous shaped body.

Suitable solvent systems are generally a combination of two or more solvents in which the major constituent is a solvent for the resin and a non-solvent for the rubber-like particles. The remaining minor quantity, which can be present in an amount of up to about 20%, by weight, is generally a solvent for the binder and a softening agent or semi-solvent for the rubber-like particles. Amounts of the softening agent of greater than about 20% are not generally desirable because of their action upon the surface of the rubber-like particles. The two or more liquids making up the solvent system should be miscible with each other, and it is preferred to use solvents which are also miscible with water. It is also desirable to use solvents with relatively high vapor pressures so that they can be readily removed by vaporization.

Preferred solvent systems comprise a mixture of one or more lower aliphatic alcohols with one or more ketones, the latter being the softening agent for the rubber-like particles. Suitable alcohols include, but are not limited to, methyl alcohol, ethyl alcohol, isopropyl alcohol, or other commerical grades of the alcohols, alone or in combination. Ethyl alcohol is particularly preferred because it possesses outstanding properties for this application. Suitable ketones include acetone, methyl ethyl ketone, cyclohexanone and the like. It is, of course, possible to use other well-known organic solvents such as acetates and the like for the softening agent.

In formulating the solution of resin binder, the resin concentration can vary over relatively wide ranges. The actual choice of resin concentration will depend upon the final properties desired in the shaped body, particularly the porosity/strength relationship. In general, as a higher percentage of resin is added, the final product will be harder and stronger but will have less resilience and be less porous. Typically, resin binders present in amounts of between about 5 and about 30%, by weight, based upon the weight of rubber-like particles, provide the required properties.

After the resin binder solution has been formed, rubber-like particles are introduced into this solution under conditions which provide good mixing to uniformly distribute individual particles throughout the liquid system. It is necessary, to form the porous shaped bodies of this invention, to use particles which can become bonded together and which have a resilient nature; therefore, such particles are referred to herein as rubber-like particles. Suitable particles can be formed from natural rubber or from any of the synthetic elastomeric materials such as copolymers of butadiene and styrene, copolymers of butadiene and acrylonitrile, polychloroprene, or from other materials having similar elasticity and resilience. Inasmuch as the voids or interstitial regions of the porous material must be of a size and character which can retain a liquid and release it under pressure, it is necessary that the particles be packed to define these voids. Because of this, it is preferable to use particles which are rounded or approach a spherical configuration. Moreover, the particles should generally have a particle size which is predominantly between about 5 and 120 microns, which is excellent for producing the porous shaped bodies of this invention.

The slurry of rubber-like particles in resin binder solution is preferably formulated to contain between about 10% and about 45% rubber-like particles, by weight, based upon the total weight of the slurry.

Liquid-suspending medium is then added to form a diluted slurry or dispersion of rubber-like particles, preferably while providing mixing. The formation of this particle dispersion also causes deposition of binder from the solution onto the rubber-like particles. In fact, it has been found in many cases that about 60–90% of the resin binder originally introduced into the solution remains on the rubber-like particles after the combination molding/filtering step. Introduction of liquid-suspending medium to the slurry raises the final porosity of the shaped bodies significantly. Water is a preferred suspending medium, but other liquids certainly can be used. The liquid-suspending medium can be added to the slurry in widely varying amounts but is typically added in amounts sufficient to provide a ratio of suspending medium/rubber particles of from about 1/1 to about 10/1. In general, the more suspending medium added, the larger will be the percentage of void volume, and therefore the porosity, of the final shaped body. Since the addition of water or other suspending medium not only affects the ultimate void volume, but also the deposition of resin onto the particles, the quantity added should be sufficient to cause a significant portion of the resin to deposit out onto the surface of the rubber-like particles. On the other hand, less than the quantity which would cause any appreciable amount of the resin binder to form a separate phase or agglomeration of binder in the dispersion is used. Adding liquid-suspending medium also can modify the flow properties of the slurry and the rate at which slurry drains and sets during the molding operation.

The dispersion is introduced into a mold which has at least one porous wall. This porous wall can be formed from a screen or filter, and typically such screens have a pore size of between about 0.025 and about 0.001 inches. Differential pressure is applied across this combination mold and filter of from about 5 to about 100 psi. This can be done by applying positive pressure on one side of the mold only, by applying a vacuum on one side of the mold only, or preferably by a combination of pressure on one side of the mold and vacuum on the other side. Typically, a positive pressure of from about 4 to about 100 psi is applied with a simultaneous vacuum of from about 1 to about 7 psi. This combination molding and filtering step removes much of the liquid from the dispersion and leaves behind a sulf-supporting structure shaped according to the particular mold used. The self-supporting structure is capable of resisting permanent deformation.

The self-supporting structure can then be dried by heating it to an elevated temperature of at least about 150° C. This causes evaporation of remaining liquids and causes the resin binder to react with the rubber-like particles; it also causes the resin binder to polymerize, both of which result in a product of improved physical and mechanical properties. After the self-supporting shaped body has been dried at an elevated temperature, it has sufficient structural integrity to act as a final product. A subsequent molding step, such as was employed in prior art processes, is not required.

The previously described steps are all that are necessary to produce a final product; nevertheless, there are additional optional steps which can be performed to provide the optimum balance of strength/porosity properties for some applications. In one of these optional steps, air or any other inert gas, can be introduced into the particle dispersion before it is molded and filtered to produce a foam. This can be done by any of the art-recognized foaming techniques, such as bubbling air into the dispersion or adding a foaming agent therein. Most conveniently, it is simply done by providing high speed agitation which draws air into the particle dispersion. Foaming, in general, increases the porosity of the final product and is usually done where the objective is to produce a porous shaped body which will hold the maximum amount of liquid. The amount of inert gas introduced can be monitored by checking the specific gravity of the dispersions. Typically, a non-foamed dispersion will have a specific gravity of around 0.9 whereas a foamed dispersion will have a value of between about 0.5 and about 0.9.

Post-treating the cured, shaped body by applying an appropriate reinforcing solution followed by an additional heating step can be done to increase the strength and other mechanical properties of the final product. This might be important, for example, where the porous shaped body will undergo significant abrasion in its dispensing of the liquid retained therein. Post-treating can also increase the desired chemical properties such as solvent or ink resistance. Post-treating solutions may contain resin binder, and can be the same as those resin binder solutions previously described, or they can be different. A particularly preferred composition is a solution comprising about 10% of a heat-activatable resin and a suitable polymerization catalyst.

Post-treating resin solutions can be applied by spraying them onto the shaped bodies already formed, by dipping the shaped body into a post-treating solution, or by any other known technique for applying a solution to an irregular surface. The amount of solution applied depends upon the ultimate balance of properties desired, and can vary rather widely. Any amount from that required to permeate only a surface layer of the shaped body up to the amount required to permeate the whole body can be applied. As more is applied, the balance of properties shifts from porosity to strength and chemical resistance. Usually, an amount below that required to significantly reduce the strength is applied.

After application of the post-treating solution, the shaped body is cured at an elevated temperature to dry the product and cure the binder. In the case of phenolic resins, some reaction with the rubber-like particles may take place at this point, but it is believed to be much less than in the initial cure.

Other post-treatment techniques can also be used in place of or in addition to the application of post-treating solutions previously described. Irradiation with ionizing radiation, such as X or gamma rays, or with high energy electrons could be done to increase the cross-linking. Also, simple heating may also increase the cross-linking of some resins. Those skilled in the art will recognize other suitable post-treating techniques to increae the strength of the porous bodies described herein.

A wide variety of liquids can be introduced into the porous, shaped bodies, either after the initial cure or after the post-treating steps. Such liquids might include, for example, water, inks, perfumes, medicaments, etc. In fact, any liquid can be introduced and retained in these bodies providing it is compatible with the rubber-like particles and binder.

These liquids can be introduced into the porous, shaped bodies in a variety of ways. One of the most simple techniques is to simply immerse the porous, shaped body in a bath of the liquid to be used. In a preferred case, the shaped body is placed under a vacuum which helps in uniformly drawing the liquid into the interstitial pores of the shaped body, particularly those deep within the body.

Figure 2:
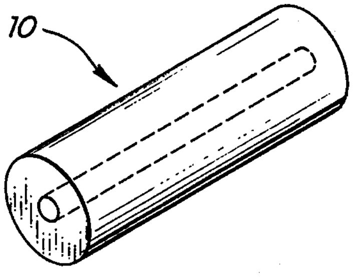
FIG. 2 is a perspective view illustrating a porous roller which can be produced by this invention; and, FIG. 3 is an end view illustrating an application for a roller of the type illustrated in FIG. 2.

An example of a finished intricate product formed from a porous, shaped body using the method described herein is the roller 10 illustrated in FIG. 2. As can be seen, there is a center hole running along the entire length of the roller 10 so that it can be mounted on a shaft. Such rollers can be formed using the techniques described herein to have a high degree of strength and porosity so that relatively large amounts of ink, such as up to about 130% or more, can be imbibed therein.

Figure 3:
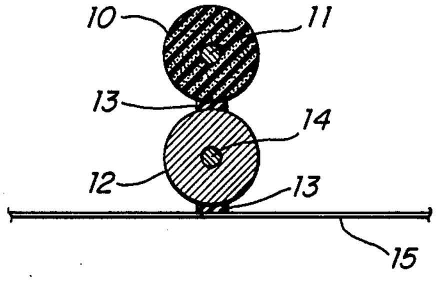

Roller 10, containing ink therein, can be used in an apparatus as illustrated in FIG. 3. Therein, ink-filled roller 10 mounted on shaft 11 is used as a reservoir of ink. Ink is controllably dispensed by bringing receptor roller 12, which ink-accepting characters 13 thereon, into pressure contact with roller 10. Roller 12 is also mounted on a shaft 14. Characters 13 are inked each time they contact ink-containing roller 10 as roller 10 revolves. Subsequently, inked characters 13 are brought into pressure contact with a receptor surface 15, such as a blank label or a price tag to be applied to goods in a grocery market. Thus, a high-speed price-labelling device can be formed in which the ink-containing roller can simply be replaced at regular periods.

The following Examples further illustrate the invention. All parts are by weight, unless otherwise specified.

EXAMPLE 1

A resin binder solution was prepared by adding 3.3 parts of Durez 12686 Novalak Phenolic Resin, a thermosetting phenol-formaldehyde resin of the two-step type obtained from Hooker Chemicals and Plastics Corp., to a mixed solvent system with moderate stirring. The mixed solvent system contained 60.1 parts of Number 30 alcohol (ethyl alcohol denatured with 5% methyl alcohol) and 6.6 parts of acetone. Ethyl alcohol is a solvent for the resin whereas acetone acts as a sofetning agent for rubber. Subsequently, 30.0 parts of Hycar 1411 powder (Goodrich Chemical Co.), was added to form a slurry of copolymer particles. Hycar 1411 powder contains particles of a copolymer formed by a copolymerizing 60% butadiene and 40% acrylonitrile, by weight. The particle size is predominantly between 5 and 120 microns although there is a small weight percent comprised of smaller particles; the average particle size is between about 25 and about 50 microns.

The resulting slurry was transferred into a Waring Blender where the rate of agitation was increased, after which 80.0 parts of water were added to dilute the slurry and form a rubber particle dispersion. The high agitation was continued for several minutes thereby beating air into the dispersion until the specific gravity of the mix equalled about 0.55. At that point, a portion of the foamed slurry was fed into a series of molds suitable for forming small rollers with a hole for a center shaft and having fine screens (e.g., 200 mesh) covering the bottoms of the molds which correspond to one end of the roll. A positive pressure of 50 psi was applied to the top of the molds while simultaneously providing a vacuum of 15 inches of Hg below the screens. Thus, a differential pressure of about 57.5 psi was provided across the molds which drove a substantial portion of liquid from the dispersion leaving behind solids which were self-supporting structures shaped into the form of rollers having center holes for shafts. These self-supporting roller structures were removed from the molds and dried in an oven at 300° F. for 30 minutes to provide roller applicators having sufficient structural integrity.

An additional resin solution was then prepared for post-treatment by combining 110 parts of a thermosetting resin with 500 parts of Number 30 alcohol and 55 parts of acetone. The thermosetting resin used was Durez 12687 Novalak Two-step Phenolic Resin, which is also produced by Hooker Chemicals and Plastics Corp. Self-supporting roller structures as previously molded and dried were dipped into the post-treating solution so that only a small amount of the solution was absorbed. The dipped rollers were then cured in an oven at 325° F. for 45 minutes. The amount of resin solids added to the roller structures was 8% based on their dry weight before addition.

The post-treated and dried porous roller structures were inked by immersing the rollers in a bath of ink. They were capable of absorbing up to about 130% of ink, based upon the dry weight of the rollers.

EXAMPLE 2

A particle dispersion was prepared following the procedure of Example 1, except as specifically stated otherwise. The ingredients added to form the dispersion were:

| Ingredients | Parts by Weight |
|---|---|
| Number 30 Alcohol | 82 |
| Acetone | 9 |
| Durez 12686 Novalak Phenolic Resin | 4.5 |
| Hycar 1411 Powdered Copolymer | 30 |
| Water | 115. |

Agitation was continued until the specific gravity of the slurry reached a value of 0.75. At that point, the slurry was molded, dried, post-treated and cured as in Example 1 to provide porous roller structures which could imbibe up to about 140% of ink.

EXAMPLE 3

The procedure of Example 2 was followed except that air was not beaten into the slurry during or prior to water addition. The specific gravity of the particle dispersion was about 0.92. Porous rollers produced were capable of imbibing up to about 120% of ink.

EXAMPLE 4

The procedure of Example 1 was followed, except for the post-treatment. The post-treatment resin solution was prepared according to the following formula:

| Ingredients | Parts by Weight |
|---|---|
| Number 30 Alcohol | 500 |
| Acetone | 55 |
| Durez 11078 Thermosetting One-step Resin | 55. |

Molded, dried, self-supporting roller structures were post-treated with a portion of this solution by dipping the structures into this solution and subsequently curing them in a circulating oven at 325° F. for 45 minutes. Post-treated roller structures had picked up 4% of resin solids, based on the dry weight of the rollers before post-treatment. These porous roller structures were capable of imbibing up to about 130% of ink.

There are, of course, many equivalents to the specific materials and steps illustrated and described as preferred embodiments herein. For example, those skilled in the art will know, or will be able to ascertain using no more than routine experimentation, many variations of the specific resin binder, solvents, rubber-like particles, liquid-suspending media, and ratios and concentrations of each, which are within the range of equivalents to those specifically given. Because of this, such equivalents are within the scope of this invention and are intended to be covered by the claims appended hereto.

What is claimed is:

1. A method for forming a porous shaped body from rubber-like particles, said shaped body being capable of retaining therein a liquid which can be dispensed upon the application of pressure to the shaped body, said method comprising the steps of:

forming a solution of a heat-activatable resin binder in a solvent system containing a major amount of a first solvent for said resin binder and a minor amount of a second solvent for said resin binder, said first solvent being a non-solvent for the rubber-like particles and said second solvent being a softening agent for the rubber-like particles, said first and said second solvents for the resin binder being miscible with each other;

combining said rubber-like particles with the resin binder solution to thereby form a particle slurry;

adding sufficient liquid-suspending medium to said particle slurry to form a particle dispersion in which resin binder is affixed to the rubber-like particles;

introducing said particle dispersion into a mold having at least one porous wall member;

applying a differential pressure of between about 5 and about 100 psi across the mold to remove liquids from said particle dispersion and to form the remaining solids into a shaped body which is self-supporting; and, heating said self-supporting shaped body to an elevated temperature to dry it and to cure the resin binder thereby providing said shaped body with structural integrity.

2. A method of claim 1 wherein the rubber-like particles are rounded particles having a mean diameter of between about 5 microns and about 120 microns.

3. A method of claim 2 wherein said rubber-like particles are present in the particle slurry in an amount of between about 10 and about 45%, by weight, based upon the total slurry weight.

4. A method of claim 3 wherein said liquid-suspending medium comprises water.

5. A method of claim 4 wherein said water is added to the particle slurry in an amount sufficient to provide a weight ratio of water/rubber particles of from about 1/1 to about 10/1.

6. A method of claim 5 wherein the softening agent for said rubber-like particles is present in an amount of up to about 20%, by weight, based upon the weight of said solvent system.

7. A method of claim 6 wherein said heat-activatable resin binder is present in the resin binder solution in an amount of between about 5 and about 30%, by weight, based upon the weight of said rubber-like particles.

8. A method of claim 7 wherein the differential pressure applied across the mold is between about 5 psi and about 100 psi.

9. A method of claim 8 wherein the self-supporting shaped body is heated to a temperature of at least about 150° C. to cure the resin binder.

10. A method claim 1 including the additional step of post-treating said cured, shaped body to increase its strength.

11. A method of claim 9 including the additional steps of:

post-treating said cured, shaped body with a solution of heat-activatable resin; and, heating said post-treated shaped body to an elevated temperature for a time sufficient to cure resin absorbed in the post-treating step.

12. A method of claim 1 including the additional step of foaming the particle dispersion prior to introducing it into said mold.

13. A method of claim 11 including the additional step of foaming the particle dispersion prior to introducing it into said mold.

14. A method of claim 1 includng the additional step of imbibing dispensable liquid into said shaped body under vacuum conditions.

15. A method of claim 13 including the additional step of imbibing dispensable liquid into said shaped body under vacuum conditions.

16. A method of claim 1 wherein said dispensable liquid comprises ink.

17. A method of claim 15 wherein said dispensable liquid comprises ink.

18. A method of claim 17 wherein said resin binder comprises a two-step type phenol-formaldehyde resin.

19. A method of claim 18 wherein said solvent system comprises a mixture of a lower aliphatic alcohol and a ketone.

20. A method of claim 19 wherein said rubber-like particles are formed from a copolymer of butadiene and acrylonitrile.

21. A shaped porous body formed according to the method of claim 1.

22. A shaped porous body formed according to the method of claim 9.

23. A shaped porous body formed according to the method of claim 10.

24. A shaped porous body formed according to the method of claim 11.

25. A shaped porous body formed according to the method of claim 13.

26. A shaped porous body formed according to the method of claim 17.

27. A shaped porous body formed according to the method of claim 20.

28. In the method of forming a shaped, porous body suitable for retaining therein a dispensable liquid, said method including the steps of forming a slurry of small rubber-like particles in a solution of a heat-activatable resin binder in a solvent system containing a major amount of a first solvent for said resin binder and a minor amount of a second solvent for said resin binder, said first solvent being a non-solvent for the rubber-like particles and said second solvent being a softening agent for the rubber-like particles, said first and said second solvents for the resin binder being miscible with each other, and adding a liquid-suspending medium to said slurry to form a dispersion of said rubber-like particles:

the improvement of forming said shaped body and adding structural integrity thereto by:

introducing said dispersion into a mold having at least one porous wall;

applying a differential pressure of from about 5 to about 100 psi across the mold to remove liquids therefrom and to form the solids into a shaped body which is self-supporting; and heating said shaped body to an elevated temperature to cure the resin binder and thereby provide structural integrity to said shaped body.

29. A method for controllably dispensing a liquid to a receptor surface, comprising:

a. forming a slurry of rubber-like particles in a solution of a heat-activatable resin binder in a solvent system containing a major amount of a first solvent for said resin binder and a minor amount of a second solvent for said resin binder, said first solvent being a non-solvent for the rubber-like particles and said second solvent being a softening agent for the rubber-like particles, said first and said second solvents for the resin binder being miscible with each other;

b. combining a liquid-suspending medium with said slurry to form a dispersion of said rubber-like particles;

c. introducing said dispersion into a mold having at least one porous wall member;

d. applying a differential pressure of from about 5 to about 100 psi across the mold to remove liquids therefrom and to form the solids into a porous shaped body which is self-supporting;

e. heating said shaped body to an elevated temperature to cure the resin binder and thereby provide structural integrity to said porous shaped body;

f. contacting the porous shaped body with liquid to be controllably dispensed under conditions whereby said liquid is imbibed into pores of said porous shaped body; and, g. bringing said porous shaped body into pressure contact with the receptor surface to controllably dispense liquid to said receptor surface.

30. A method of claim 29 wherein said liquid to be controllably dispensed comprises ink.

* * * * *